(12) United States Patent
Garimella

(10) Patent No.: US 7,708,184 B2
(45) Date of Patent: May 4, 2010

(54) MICROWAVE BRAZING OF AIRFOIL CRACKS

(75) Inventor: Balaji Rao Garimella, Singapore (SG)

(73) Assignee: United Technologies Corporation, Hartford, CT (US)

( * ) Notice: Subject to any disclaimer, the term of this patent is extended or adjusted under 35 U.S.C. 154(b) by 336 days.

(21) Appl. No.: 10/956,551

(22) Filed: Oct. 1, 2004

(65) Prior Publication Data
US 2006/0071053 A1 Apr. 6, 2006

(51) Int. Cl.
B23K 31/02 (2006.01)

(52) U.S. Cl. .................. 228/119; 228/245; 228/262.31

(58) Field of Classification Search .................. None
See application file for complete search history.

(56) References Cited

U.S. PATENT DOCUMENTS

| | | | |
|---|---|---|---|
| 4,008,844 A * | 2/1977 | Duvall et al. ............... | 228/119 |
| 4,285,459 A | 8/1981 | Baladjanian et al. | |
| 4,705,203 A * | 11/1987 | McComas et al. .......... | 228/119 |
| 5,156,321 A * | 10/1992 | Liburdi et al. .............. | 228/119 |
| 5,666,643 A | 9/1997 | Chesnes et al. | |
| 5,806,751 A * | 9/1998 | Schaefer et al. ............ | 228/119 |
| 6,054,693 A | 4/2000 | Barmatz et al. | |
| 6,195,864 B1 * | 3/2001 | Chesnes .................. | 29/402.01 |
| 6,470,568 B2 * | 10/2002 | Fried et al. ................ | 29/889.1 |
| 6,520,401 B1 * | 2/2003 | Miglietti .................... | 228/194 |
| 7,121,791 B2 | 10/2006 | Friedl et al. | |
| 7,416,108 B2 * | 8/2008 | Philip ........................ | 228/248.1 |
| 2004/0050913 A1 * | 3/2004 | Philip ........................ | 228/194 |
| 2004/0262366 A1 * | 12/2004 | Kinstler ..................... | 228/119 |
| 2005/0274009 A1 * | 12/2005 | Powers ...................... | 29/889.1 |

FOREIGN PATENT DOCUMENTS

EP 1 312 437 11/2001

OTHER PUBLICATIONS

Drake W.M. et al., Brazing Using 2.45 GHz Microwaves, Proceedings from Material Solutions 2003 on Joining of Advanced and Specialty Materials, Oct. 13-15, 2003, Pittsburgh, PA.
Australian Search Report dated Jun. 19, 2006.
Drake et al., Brazing Using 2.45 GHz Microwaves, ASM Conference Proceedings From Joining of Advanced and Specialty Materials, Oct. 15, 2003.
European Search Report dated Jan. 12, 2006.

* cited by examiner

*Primary Examiner*—Kiley Stoner
(74) *Attorney, Agent, or Firm*—Carlson, Gaskey & Olds

(57) ABSTRACT

A gas turbine engine includes alternating rows of rotary airfoils or blades and static airfoils or vanes. The vanes are made of a base metal, such as cobalt or nickel superalloy. If a crack forms in one of the vanes, a braze alloy is applied to the crack. The braze alloy is a powdered slurry. The braze alloy includes approximately 50 to 100% of a base material and approximately 0 to 50% of a braze material. The base material of the braze alloy has the same composition as the composition of the base metal of the vane. The airfoil is then exposed to microwaves which melt the braze alloy in preference to the base metal to repair the crack in the vane.

6 Claims, 2 Drawing Sheets

MICROWAVE BRAZING OF AIRFOIL CRACKS

BACKGROUND OF THE INVENTION

The present invention relates generally to a method of repairing cracks in a stationary airfoil or vane of a gas turbine engine by microwave brazing.

A gas turbine engine includes stationary airfoils or vanes made of a base metal of either cobalt or nickel superalloy. The vanes may crack due to high temperature thermal mechanical fatigue and hot corrosion that occurs during engine operation. The crack is usually repaired by brazing. A braze alloy including approximately 50% of a base material and approximately 50% of a braze material is applied to the crack. The melting temperature of the braze material is lower than the melting temperature of the base material.

After the braze alloy is applied to the crack, the vane is heated in a heating furnace. The braze alloy melts and fills the crack. Typically, the vane is heated for approximately 6 to 8 hours to melt the braze alloy and repair the crack.

The percentage of the base material should be relatively high and the percentage of the braze material should be relatively low to prevent the braze material from saturating the braze alloy and to ensure that the composition of the braze alloy is as similar as possible to the composition of the base metal. However, as the percentage of the base material increases, the melting temperature of the braze alloy also increases. If the vane is exposed to higher temperatures, the vane can possibly distort and lose its properties. Therefore, the braze alloy generally includes a high percentage of the braze material to keep the melting temperature low.

Hence, there is a need in the art for a method of repairing a crack in a vane of a gas turbine engine that is fast and that overcomes the shortcomings and drawbacks of the prior art.

SUMMARY OF THE INVENTION

A gas turbine engine includes alternating rows of rotary airfoils or blades and static airfoils or vanes. The vanes are made of a base metal, such as cobalt or nickel superalloy.

In the present invention, any cracks that form in the vane are repaired by microwave brazing. A braze alloy including a base material and a braze material is applied to the crack. The braze alloy is a powdered slurry. The braze alloy includes approximately 50 to 100% of the base material and approximately 0 to 50% of the braze material. The base material and the base metal of the vane have the same composition.

After applying the braze alloy to the crack, the vane is then exposed to microwaves to melt the braze alloy and repair the crack in the vane. The microwaves heat and melt the powdered braze alloy in preference to the base metal of the vane, leaving the vane undisturbed. Therefore, at the same melting temperature, the braze alloy of the present invention can include a greater percentage of base material than the braze alloy of the prior art.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
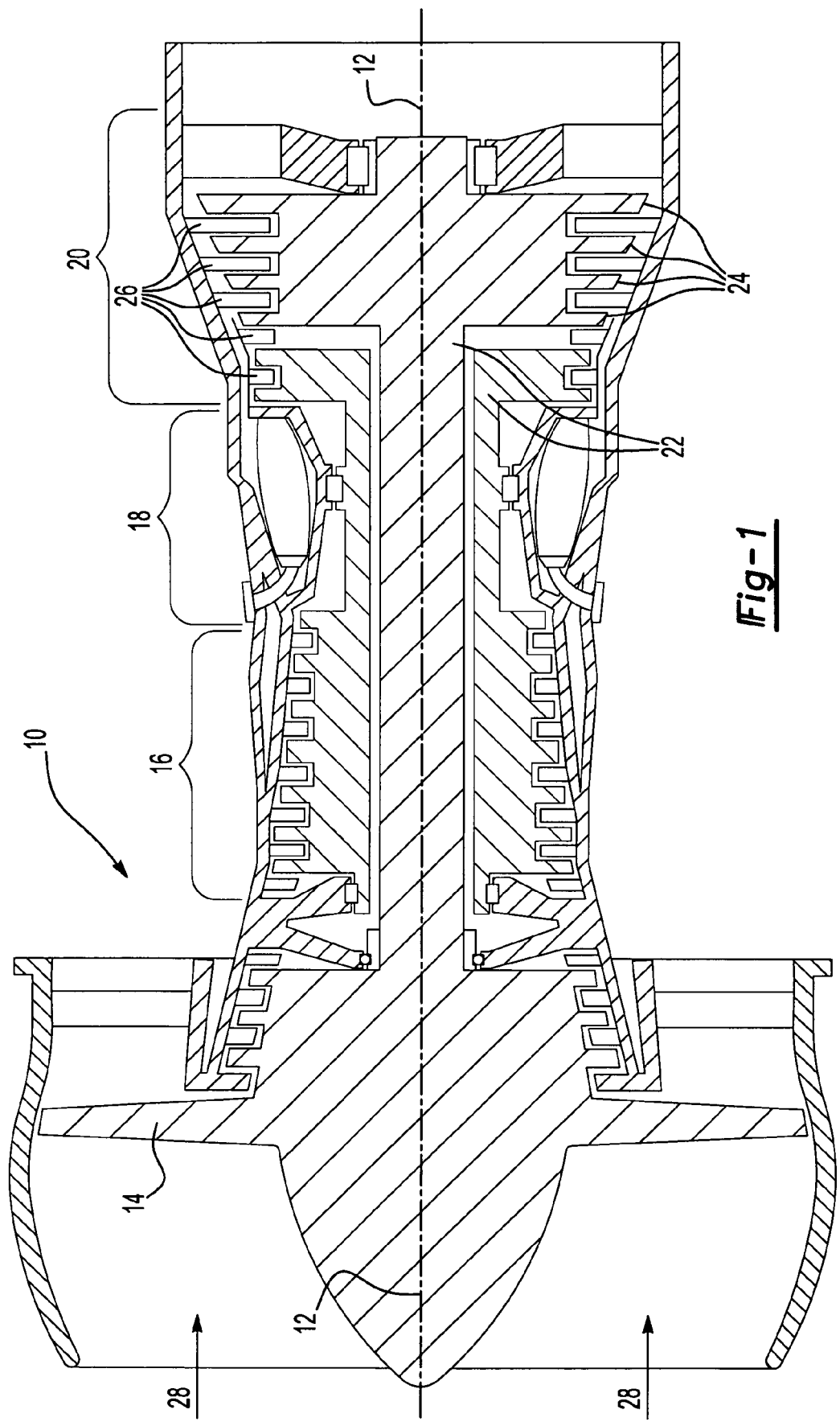
FIG. 1 schematically illustrates a gas turbine engine.

FIG. 1 schematically illustrates a gas turbine engine 10 used for power generation or propulsion. The gas turbine engine 10 includes an axial centerline 12, a fan 14, a compressor 16, a combustion section 18 and a turbine 20. Air compressed in the compressor 16 is mixed with fuel, burned in the combustion section 18 and expanded in the turbine 20. The air compressed in the compressor 16 and the fuel mixture expanded in the turbine 20 are both referred to as a hot gas stream flow 28. Rotors 22 of the turbine 20 rotate in response to the expansion and drive the compressor 16 and the fan 14. The turbine 20 also includes alternating rows of rotary airfoils or blades 24 on the rotors 22 and static airfoils or vanes 26. The vanes 26 are arranged in various stages, such a first stage, a second stage, a third stage, a fourth stage, etc. The vanes 26 in the first stage are made of a base metal of cobalt superalloy, and the vanes 26 in the other stages (second stage, third stage, etc.) are made of a base metal of nickel superalloy.

Figure 2:
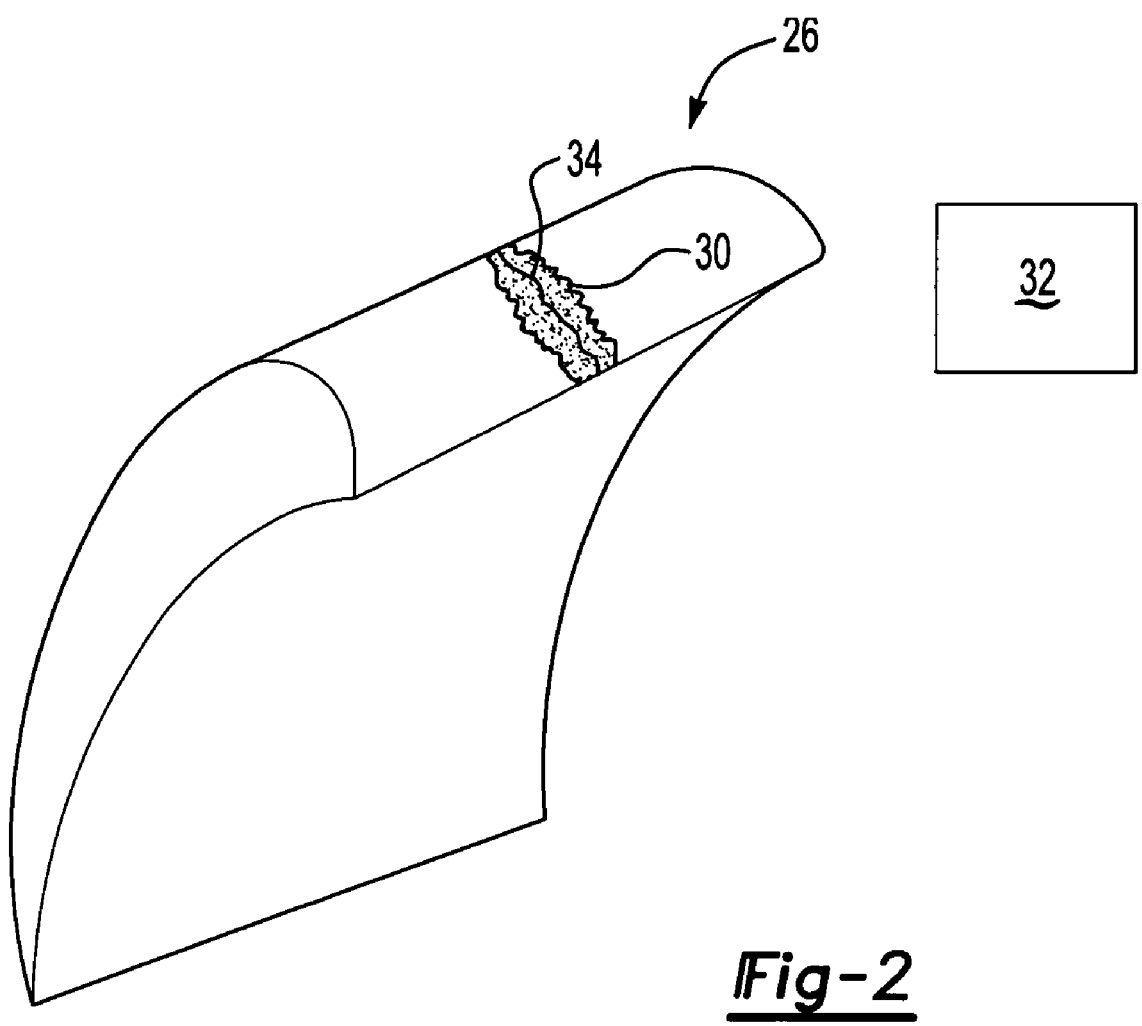
FIG. 2 schematically illustrates a vane of the gas turbine engine.

As shown in FIG. 2, cracks 34 may develop in the vanes 26 over time due to high thermal temperature mechanical fatigue and hot corrosion that occurs during engine operation. If a crack 34 forms in the vane 26, a braze alloy 30 is applied to the crack 34 to repair the vane 26.

The braze alloy 30 is a thick liquid powdered slurry made of a base material and a braze material. The braze material is a powder having a low melting temperature. The base material is a powder that has the same composition as the superalloy used to form the vane 26. The braze alloy 30 includes a reduced amount of braze material over the braze alloy of the prior art and has a low transient liquid phase ratio (TLP), reducing the risk of saturating the braze alloy 30 with the braze material.

Preferably, the braze alloy 30 includes approximately 50 to 100% of the base material and approximately 0 to 50% of the braze material. More preferably, the base alloy 30 includes approximately 90% of the base material and approximately 10% of the braze material. However, it is to be understood that the braze alloy 30 could include any percentage of base material and braze material. For example, the braze alloy 30 could include 100% base material or 100% braze material.

If the braze alloy 30 is being applied to a first stage vane 26, the braze alloy 30 includes the base material of cobalt superalloy and the braze material. The braze alloy 30 preferably includes approximately 50 to 100% of the base material and approximately 0 to 50% of the braze material. In one example, the base material of cobalt superalloy includes carbon, manganese, silicon, sulfur, chromium, nickel, tungsten, tantalum, titanium, zirconium, iron, boron and cobalt. Table 1 lists an example composition of the cobalt superalloy. The braze material includes carbon, chromium, nickel, boron, and cobalt. Table 2 lists an example composition of the braze material. Although specific compositions of the base material and the braze material are described and listed in Tables 1 and 2, it is to be understood that the braze alloy 30 can have any composition, and one skilled in the art would know what compositions to use.

TABLE 1

| ELEMENT | MINIMUM PERCENT | MAXIMUM PERCENT |
| --- | --- | --- |
| CARBON | 0.00 | 0.80 |
| MANGANESE | 0.00 | 0.80 |
| SILICON | 0.00 | 0.80 |
| SULFUR | 0.00 | 0.80 |
| CHROMIUM | 18.0 | 26.00 |
| NICKEL | 8.00 | 12.00 |
| TUNGSTEN | 5.00 | 8.00 |
| TANTALUM | 2.00 | 4.00 |
| TITANIUM | 0.10 | 0.30 |
| ZIRCONIUM | 0.00 | 0.60 |
| IRON | 0.00 | 2.50 |
| BORON | 0.00 | 0.01 |
| COBALT | 0.00 | BALANCE |

TABLE 2

| ELEMENT | MINIMUM PERCENT | MAXIMUM PERCENT |
| --- | --- | --- |
| CARBON | 0.00 | 4.50 |
| CHROMIUM | 19.50 | 29.50 |
| NICKEL | 34.50 | 45.50 |
| BORON | 2.00 | 4.00 |
| COBALT | 0.00 | BALANCE |

If the braze alloy 30 is being applied to a second stage, a third stage, etc. vane 26, the braze alloy 30 includes the base material of nickel superalloy and the braze material. The braze alloy 30 preferably includes approximately 50 to 100% of the base material and approximately 0 to 50% of the braze material. In one example, the base material of nickel superalloy includes carbon, manganese, silicon, phosphorus, sulfur, chromium, cobalt, tungsten, tantalum, aluminum, titanium, hafnium, molybdenum, boron, iron, columbium, copper, zirconium, lead, bismuth, selenium, tellurium, thallium and nickel. Table 3 lists an example composition of the nickel superalloy. In another example, the base material of nickel superalloy includes carbon, manganese, silicon, sulfur, aluminum, molybdenum, tantalum, columbium, chromium, titanium, zirconium, iron, cobalt, copper, lead, bismuth, boron, and a nickel cobalt mixture. Table 4 lists an example composition of the nickel superalloy. Although specific compositions of the base material are described and listed in Tables 3 and 4, it is to be understood that the base material can have any composition, and one skilled in the art would know what compositions to use.

One of the base materials listed in Tables 3 and 4 is mixed with the braze material. In one example, the braze material is made of carbon, sulfur, phosphorus, copper, lead, bismuth, selenium, silicon, iron, zirconium, manganese, aluminum, hafnium, tungsten, boron, cobalt, chromium and nickel. Table 5 lists an example composition of the braze material that is mixed with the base material of nickel superalloy listed in either Table 3 or 4. Although a specific composition of the braze material is described and listed in Table 5, it is to be understood that the braze material can have any composition, and one skilled in the art would know what composition to use.

TABLE 3

| ELEMENT | MINIMUM PERCENT | MAXIMUM PERCENT |
| --- | --- | --- |
| CARBON | 0.00 | 0.27 |
| MANGANESE | 0.00 | 0.30 |
| SILICON | 0.00 | 0.30 |
| PHOSPHORUS | 0.00 | 0.30 |
| SULFUR | 0.00 | 0.30 |
| CHROMIUM | 8.00 | 12.00 |
| COBALT | 8.00 | 12.00 |
| TUNGSTEN | 8.00 | 12.00 |
| TANTALUM | 2.00 | 6.00 |
| ALUMINUM | 2.00 | 6.00 |
| TITANIUM | 0.50 | 2.00 |
| HAFNIUM | 0.50 | 2.00 |
| MOLYBDENUM | 0.50 | 2.00 |
| BORON | 0.00 | 0.25 |
| IRON | 0.00 | 0.25 |
| COLUMBIUM | 0.00 | 0.25 |
| COPPER | 0.00 | 0.25 |
| ZIRCONIUM | 0.00 | 0.25 |
| LEAD | 0.00 | 0.25 |
| BISMUTH | 0.00 | 0.25 |
| SELENIUM | 0.00 | 0.25 |
| TELLURIUM | 0.00 | 0.25 |
| THALLIUM | 0.00 | 0.25 |
| NICKEL | 0.00 | BALANCE |

TABLE 4

| ELEMENT | MINIMUM PERCENT | MAXIMUM PERCENT |
| --- | --- | --- |
| CARBON | 0.00 | 0.35 |
| MANGANESE | 0.00 | 0.35 |
| SILICON | 0.00 | 0.35 |
| SULFUR | 0.00 | 0.35 |
| ALUMINUM | 0.00 | 7.00 |
| MOLYBDENUM | 0.00 | 7.00 |
| TANTALUM | 0.00 | 7.00 |
| COLUMBIUM | 0.00 | 7.00 |
| CHROMIUM | 11.00 | 16.00 |
| TITANIUM | 0.00 | 1.50 |
| ZIRCONIUM | 0.00 | 1.50 |
| IRON | 0.00 | 1.50 |
| COBALT | 0.00 | 1.50 |
| COPPER | 0.00 | 0.50 |
| LEAD | 0.00 | 0.50 |
| BISMUTH | 0.00 | 0.50 |
| BORON | 0.00 | 0.50 |
| NICKEL + COBALT | 0.00 | BALANCE |

TABLE 5

| ELEMENT | MINIMUM PERCENT | MAXIMUM PERCENT |
| --- | --- | --- |
| CARBON | 0.00 | 0.20 |
| SULFUR | 0.00 | 0.20 |
| PHOSPHORUS | 0.00 | 0.20 |
| COPPER | 0.00 | 0.20 |
| LEAD | 0.00 | 0.20 |
| BISMUTH | 0.00 | 0.20 |
| SELENIUM | 0.00 | 0.20 |
| SILICON | 0.00 | 0.20 |
| IRON | 0.00 | 0.20 |
| ZIRCONIUM | 0.00 | 0.20 |
| MANGANESE | 0.00 | 0.20 |
| ALUMINUM | 0.00 | 2.50 |
| HAFNIUM | 0.00 | 2.50 |
| TUNGSTEN | 2.00 | 5.00 |
| BORON | 2.00 | 5.00 |
| COBALT | 7.00 | 11.00 |
| CHROMIUM | 7.00 | 11.00 |
| NICKEL | 0.00 | BALANCE |

After the braze alloy 30 is applied to any cracks 34 in the vane 26, the braze alloy 30 is then exposed to microwaves to melt the braze alloy 30 and repair the cracks 34. A microwave source 32 produces the microwaves that heat and melt the braze alloy 30 in preference to the base metal. When the braze alloy 30 cools, the braze alloy 30 hardens within the crack 34, producing a braze joint that repairs the crack 34 and builds up the eroded surface of the vane 26 to extend the life of the vane 26. The braze alloy 30 can also fill in the eroded surfaces on the vane 26 and dimensionally restore the vane 26.

Preferably, the braze alloy 30 is exposed to the microwaves for approximately 5 minutes to 60 minutes, and the braze alloy 30 reaches the melting temperature in approximately 15 minutes. Preferably, the braze alloy 30 is heated to approximately 2050 to 2250° F. to heat the braze alloy 30. However, the braze alloy 30 can be exposed to microwaves for any amount of time and can be heated to any temperature, and one skilled in the art would know how long to expose the braze alloy 30 to microwaves. Preferably, the microwaves are in the range of 2.45 GHZ.

Because the braze alloy 30 is a powder, the microwaves heat and melt the powdered braze alloy 30 in preference to the base metal of the vane 26. This is because the microwaves heat the braze alloy 30 faster than the base metal. Therefore, the microwaves do not affect the base metal of vane 26 during the microwave brazing process.

The braze alloy 30 of the present invention including an increased amount of base material melts at the same melting temperature as the braze alloy of the prior art that includes less base material. For example, the braze alloy 30 of the present invention melts at a first melting temperature when employing microwaves. If a braze alloy having the same composition is applied to the vane 26 and heated without using microwaves, the braze alloy would melt at a second melting temperature that is greater than the first melting temperature. In the prior braze alloy, when heating the vane 26 to the second higher melting temperature, the vane 26 can possibly distort. The braze alloy 30 of the present invention that is exposed to microwaves and melts at a given temperature includes a greater amount of base material than the braze alloy of the prior art that melts at the same melting temperature. Therefore, by employing microwaves that preferentially heat the braze alloy 30 over the base metal of the vane 26, the braze alloy 30 of the present invention can include a higher percentage of base material when exposed to the same melting temperature. This allows the composition of the braze alloy 30 to be more similar to the composition of the base metal material of the vane 26.

By employing microwaves from a microwave source 32 rather than heat from a heating furnace to melt the braze alloy 30, the percent content of the base material of the braze alloy 30 can be increased over the percent content of the base material of the braze alloy of the prior art that melts at the same melting temperature. The braze alloy 30 of the present invention does not need to be heated to a melting temperature as high as the melting temperature needed to melt an equivalent braze alloy 30 of the prior art, reducing the distortion and loss of properties of the vane 26.

The foregoing description is exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention.

What is claimed is:

1. A method of repairing a crack in an airfoil and dimensionally restoring the airfoil, the method comprising the steps of:

applying a braze alloy to a crack in an airfoil utilized in a gas turbine engine, wherein the airfoil is made of a base metal, the braze alloy includes a base material and a braze material, the base material has the same composition as the base metal, the braze alloy is composed of more than 50% of the base material and less than 50% of the braze material, and the airfoil is a single unitary component, wherein the base material is a cobalt superalloy and includes carbon, manganese, silicon, sulfur, chromium, nickel, tungsten, tantalum, titanium, zirconium, iron, boron, and cobalt, and the braze material includes carbon, chromium, nickel, boron, and cobalt; and exposing the airfoil to microwaves to melt the braze alloy and repair the crack in the airfoil.

2. The method as recited in claim 1 wherein the base material includes 0.00 to 0.80% carbon, 0.00 to 0.80% manganese, 0.00 to 0.80% silicon, 0.00 to 0.80% sulfur, 18.0 to 26.00% chromium, 8.00 to 12.00% nickel, 5.00 to 8.00% tungsten, 2.00 to 4.00% tantalum, 0.10 to 0.30% titanium, 0.00 to 0.60% zirconium, 0.00 to 2.50% iron, 0.00 to 0.01% boron and the balance is cobalt, and the braze material includes 0.00 to 4.50% carbon, 19.50 to 29.50% chromium, 34.50% to 45.50% nickel, 2.00 to 4.00% boron, and the balance is cobalt.

3. A method of repairing a crack in an airfoil and dimensionally restoring the airfoil, the method comprising the steps of:

applying a braze alloy to a crack in an airfoil utilized in a gas turbine engine, wherein the airfoil is made of a base metal, the braze alloy includes a base material and a braze material, the base material has the same composition as the base metal, the braze alloy is composed of more than 50% of the base material and less than 50% of the braze material, and the airfoil is a single unitary component, wherein the base material is a nickel superalloy and includes carbon, manganese, silicon, phosphorus, sulfur, chromium, cobalt, tungsten, tantalum, aluminum, titanium, hafnium, molybdenum, boron, iron, columbium, copper, zirconium, lead, bismuth, selenium, tellurium, thallium, and nickel, and the braze material includes carbon, sulfur, phosphorus, copper, lead, bismuth, selenium, silicon, iron, zirconium, manganese, aluminum, hafnium, tungsten, boron, cobalt, chromium, and nickel; and exposing the airfoil to microwaves to melt the braze alloy and repair the crack in the airfoil.

4. The method as recited in claim 3 wherein the base material is a nickel superalloy and includes 0.00 to 0.27% carbon, 0.00 to 0.30% manganese, 0.00 to 0.30% silicon, 0.00 to 0.30% phosphorus, 0.00 to 0.30% sulfur, 8.00 to 12.00% chromium, 8.00 to 12.00% cobalt, 8.00 to 12.00% tungsten, 2.00 to 6.00% tantalum, 2.00 to 6.00% aluminum, 0.50 to 2.00% titanium, 0.50 to 2.00% hafnium, 0.50 to 2.00% molybdenum, 0.00 to 0.25% boron, 0.00 to 0.25% iron, 0.00 to 0.25% columbium, 0.00 to 0.25% copper, 0.00 to 0.25% zirconium, 0.00 to 0.25% lead, 0.00 to 0.25% bismuth, 0.00 to 0.25% selenium, 0.00 to 0.25% tellurium, 0.00 to 0.25% thallium and the balance of nickel, and the braze material includes 0.00 to 0.20% carbon, 0.00 to 0.20% sulfur, 0.00 to 0.20% phosphorus, 0.00 to 0.20% copper, 0.00 to 0.20% lead, 0.00 to 0.20% bismuth, 0.00 to 0.20% selenium, 0.00 to 0.20% silicon, 0.00 to 0.20% iron, 0.00 to 0.20% zirconium, 0.00 to 0.20% manganese, 0.00 to 2.50% aluminum, 0.00 to 2.50% hafnium, 2.00 to 5.00% tungsten, 2.00 to 5.00% boron, 7.00 to 11.00% cobalt, 7.00 to 11.00% chromium, and the balance is nickel.

5. A method of repairing a crack in an airfoil and dimensionally restoring the airfoil, the method comprising the steps of:

applying a braze alloy to a crack in an airfoil utilized in a gas turbine engine, wherein the airfoil is made of a base metal, the braze alloy includes a base material and a braze material, the base material has the same composition as the base metal, the braze alloy is composed of more than 50% of the base material and less than 50% of the braze material, and the airfoil is a single unitary component, wherein the base material is a nickel superalloy and includes carbon, manganese, silicon, sulfur, aluminum, molybdenum, tantalum, columbium, chromium, titanium, zirconium, iron, cobalt, copper, lead, bismuth, boron, and a nickel cobalt mixture, and the braze material includes carbon, sulfur, phosphorus, copper, lead, bismuth, selenium, silicon, iron, zirconium, manganese, aluminum, hafnium, tungsten, boron, cobalt, chromium, and nickel; and exposing the airfoil to microwaves to melt the braze alloy and repair the crack in the airfoil.

6. The method as recited in claim 5 wherein the base material is a nickel superalloy and includes 0.00 to 0.35% carbon, 0.00 to 0.35% manganese, 0.00 to 0.35% silicon, 0.00 to 0.35% sulfur, 0.00 to 7.00% aluminum, 0.00 to 7.00% molybdenum, 0.00 to 7.00% tantalum, 0.00 to 7.00% columbium, 11.00 to 16.00% chromium, 0.00 to 1.50% titanium, 0.00 to 1.50% zirconium, 0.00 to 1.50% iron, 0.00 to 1.50% cobalt, 0.00 to 0.50% copper, 0.00 to 0.50% lead, 0.00 to 0.50% bismuth, 0.00 to 0.50% boron, and the balance is a nickel cobalt mixture, and the braze material includes 0.00 to 0.20% carbon, 0.00 to 0.20% sulfur, 0.00 to 0.20% phosphorus, 0.00 to 0.20% copper, 0.00 to 0.20% lead, 0.00 to 0.20% bismuth, 0.00 to 0.20% selenium, 0.00 to 0.20% silicon, 0.00 to 0.20% iron, 0.00 to 0.20% zirconium, 0.00 to 0.20% manganese, 0.00 to 2.50% aluminum, 0.00 to 2.50% hafnium, 2.00 to 5.00% tungsten, 2.00 to 5.00% boron, 7.00 to 11.00% cobalt, 7.00 to 11.00% chromium, and the balance is nickel; and exposing the airfoil to microwaves to melt the braze alloy and repair the crack in the airfoil.

\* \* \* \* \*